(12) United States Patent
Russell et al.

(10) Patent No.: US 12,285,717 B2
(45) Date of Patent: Apr. 29, 2025

(54) PROCESSES AND APPARATUSES FOR OPERATING A GAS COMPRESSOR

(71) Applicant: UOP LLC, Des Plaines, IL (US)

(72) Inventors: Bradley Russell, Fall Branch, TN (US); Michael R. Van de Cotte, Palatine, IL (US); William Cady, Chicago, IL (US); Nasser Khazeni, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 477 days.

(21) Appl. No.: 17/820,274

(22) Filed: Aug. 17, 2022

(65) Prior Publication Data

US 2023/0191311 A1    Jun. 22, 2023

Related U.S. Application Data

(60) Provisional application No. 63/292,523, filed on Dec. 22, 2021.

(51) Int. Cl.
| | |
|---|---|
| *F04D 17/02* | (2006.01) |
| *B01D 53/04* | (2006.01) |
| *B01D 53/053* | (2006.01) |
| *F04D 17/10* | (2006.01) |
| *F04D 27/00* | (2006.01) |
| *F04D 27/02* | (2006.01) |

(52) U.S. Cl.
CPC ....... *B01D 53/053* (2013.01); *B01D 53/0446* (2013.01); *F04D 17/10* (2013.01); *F04D 27/00* (2013.01); *F04D 27/02* (2013.01); *B01D 2257/504* (2013.01); *B01D 2259/40007* (2013.01); *B01D 2259/416* (2013.01)

(58) Field of Classification Search
CPC .............. B01D 53/053; B01D 53/0446; B01D 2257/504; B01D 2259/40007; B01D 2259/416; B01D 3/14; B01D 53/002; B01D 53/047; B01D 2256/16; B01D 2256/22; F25J 2230/30; F25J 3/0295; F25J 2205/40; F25J 2205/64; F25J 2210/04; F25J 2215/04; F25J 2245/90; F25J 2280/02; F25J 2290/62; F25J 3/0223; F25J 3/0252; F25J 3/0266; F04D 27/02; F04D 27/00; F04D 17/10
USPC ...................... 95/22–24, 96, 98; 96/109, 110
See application file for complete search history.

(56) References Cited

U.S. PATENT DOCUMENTS

| | | | |
|---|---|---|---|
| 5,798,941 A | 8/1998 | McLeister | |
| 6,279,344 B1 * | 8/2001 | Drnevich | ................. F25J 3/046 62/646 |

(Continued)

FOREIGN PATENT DOCUMENTS

| | | |
|---|---|---|
| EP | 3037668 A1 | 6/2016 |
| WO | 2015198822 A1 | 12/2015 |

OTHER PUBLICATIONS

International Search Report and Written Opinion from corresponding PCT application No. PCT/US2022/081803 mailed Apr. 19, 2023.

*Primary Examiner* — Frank M Lawrence, Jr.

(57) ABSTRACT

Processes and apparatuses for operating a centrifugal gas compressor. A storage tank containing a liquid buffer material is provided and used to offset density fluctuations in the gas stream passed to the compressor. The storage tank may contain a component of the high-pressure gas stream provided by the compressor, such as carbon dioxide.

20 Claims, 3 Drawing Sheets

(56) References Cited

U.S. PATENT DOCUMENTS

| | | |
|---|---|---|
| 2008/0184736 A1* | 8/2008 | Peyron .................. F25J 3/04478 62/643 |
| 2012/0224980 A1 | 9/2012 | Uptigrove |
| 2013/0299337 A1* | 11/2013 | Darde .................... F25J 3/0266 203/88 |
| 2016/0177958 A1 | 6/2016 | Schneider |
| 2017/0146001 A1 | 5/2017 | Nagura et al. |
| 2017/0254338 A1 | 9/2017 | Lee |

* cited by examiner

PROCESSES AND APPARATUSES FOR OPERATING A GAS COMPRESSOR

RELATED APPLICATIONS

This application claims priority to U.S. Provisional Patent Application Ser. No. 63/292,523, filed on Dec. 22, 2021, the entirety of which is incorporated herein by reference.

FIELD OF THE INVENTION

This invention relates generally to processes and apparatuses for operating a gas compressor, and more particularly to processes and apparatuses which use a gaseous buffer stream taken from a liquid storage tank to protect the gas compressor from surges.

BACKGROUND OF THE INVENTION

A centrifugal gas compressor provides efficiency, cost, and scalability advantages compared to other types of gas compressors, such as oil-flooded screw compressors, for large gas flow rates. This type of compressor can be used for compression of pressure swing adsorption (PSA) unit tail gas in, for example, steam methane reforming (SMR) or ATR hydrogen plants, gasification processes, steel plant (blast furnace) off gas, etc. While effective for their intended purpose, one disadvantage associated with centrifugal gas compressors is their sensitivity to dynamic fluctuations in gas density. This may impact their ability to effectively and efficiently be utilized in configurations with varying gas compositions. One such contemplated configuration is with a PSA tail gas which has variations of composition/molecular weight during PSA cycling and transitions between operating modes.

As is known, a PSA unit generally includes four or more adsorption vessels, and each vessel includes a plurality of adsorbent layers. In the PSA unit, a multicomponent gas is typically fed to at least one of a plurality of adsorption beds at an elevated pressure effective to adsorb at least one component, while at least one other component passes through. At a defined time, feed to the adsorber is terminated and the bed is depressurized by one or more co-current depressurization steps wherein pressure is reduced to a defined level which permits the separated, less-strongly adsorbed component or components remaining in the bed to be drawn off without significant concentration of the more-strongly adsorbed components. Then, the bed is depressurized by a countercurrent depressurization step wherein the pressure on the bed is further reduced by withdrawing desorbed gas counter-currently to the direction of feed. Finally, the bed is purged and repressurized. The final stage of re-pressurization is with product gas or feed gas. Accordingly, the tail gas stream from the PSA unit is constantly changing in composition and flow rate. Tail gas mixing tanks are typically used to dampen composition and flow rate variations, but significant variation still remains downstream of the mixing tank.

Anti-surge systems can be used on centrifugal compressors for protection in dynamic service. This type of anti-surge control uses an anti-surge valve (ASV) to recycle a slipstream of discharge gas back to the suction (spillback) of the compressor in order to maintain forward flow during periods when the surge limit is approached. However, a disadvantage of this approach is that by taking a portion of the compressed stream, flow disturbances are introduced into downstream operations like a carbon dioxide recovery system.

Accordingly, it would be desirable to improve operational reliability and robustness of centrifugal gas compressors in dynamic service without undue flow disturbances to the downstream process.

SUMMARY OF THE INVENTION

The present invention addresses these problems by using a secondary anti-surge control loop. A slipstream of liquid product is stored in a tank on level control. The secondary anti-surge controller injects gas from this tank into the compressor suction in order to dampen gas density fluctuations (especially during periods of low molecular weight excursions). This secondary anti-surge controller reduces the load on the primary spillback anti-surge system and reduces disturbances to downstream operations (since less discharge gas is recycled) thereby improving overall system operability, reliability, and robustness. The liquid tank serves as a capacitor in the system, and the high storage density of liquid, such as carbon dioxide, allows a small, low-cost tank to be used for large buffering capacity.

Therefore, the present invention may be characterized, in at least one aspect, as providing a process for compressing a gas stream by: passing a feed stream to a centrifugal compressor, the feed stream comprising a gas stream; mixing, upstream up of the compressor, a buffer stream, from a storage vessel, with the feed stream, wherein the storage vessel comprises a liquid buffer material, and the buffer stream comprises a gaseous phase of the liquid buffer material; and, increasing a pressure of the feed stream and the buffer stream in the compressor to provide a high-pressure gas stream having pressure greater than a pressure of the feed stream.

The present invention may also be broadly characterized as providing a process for compressing a gas stream by: passing a feed stream to a centrifugal compressor, the feed stream comprising a gas stream; obtaining data on one or more conditions of the feed stream; comparing the obtained data against one or more threshold values and when the obtained value is outside of the one or more thresholds, mixing, upstream up of the compressor, a buffer stream, from a storage vessel, with the feed stream, wherein the storage vessel comprises a liquid buffer material, and the buffer stream comprises a gaseous phase of the liquid buffer material; and, increasing a pressure of the feed stream and the buffer stream in the compressor to provide a high-pressure gas stream having pressure greater than a pressure of the feed stream.

The present invention may also be generally characterized as providing an apparatus for producing a high-pressure gas stream, the apparatus having: a centrifugal compressor configured to receive a gas stream and provide the high-pressure gas stream having a pressure higher than a pressure of the gas stream; a storage tank containing a liquid buffer material; a line configured to provide a stream from the storage tank to the compressor; and, a valve in the line configured to control the flow rate of the stream provided to the compressor.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, a system for surge protection in a centrifugal compressor has been invented. The surge protection utilities a liquid product as the source of a buffer gas material. This reduces the use of the compressed product stream as the buffer material.

With these general principles in mind, one or more embodiments of the present invention will be described with the understanding that the following description is not intended to be limiting.

Figure 1:
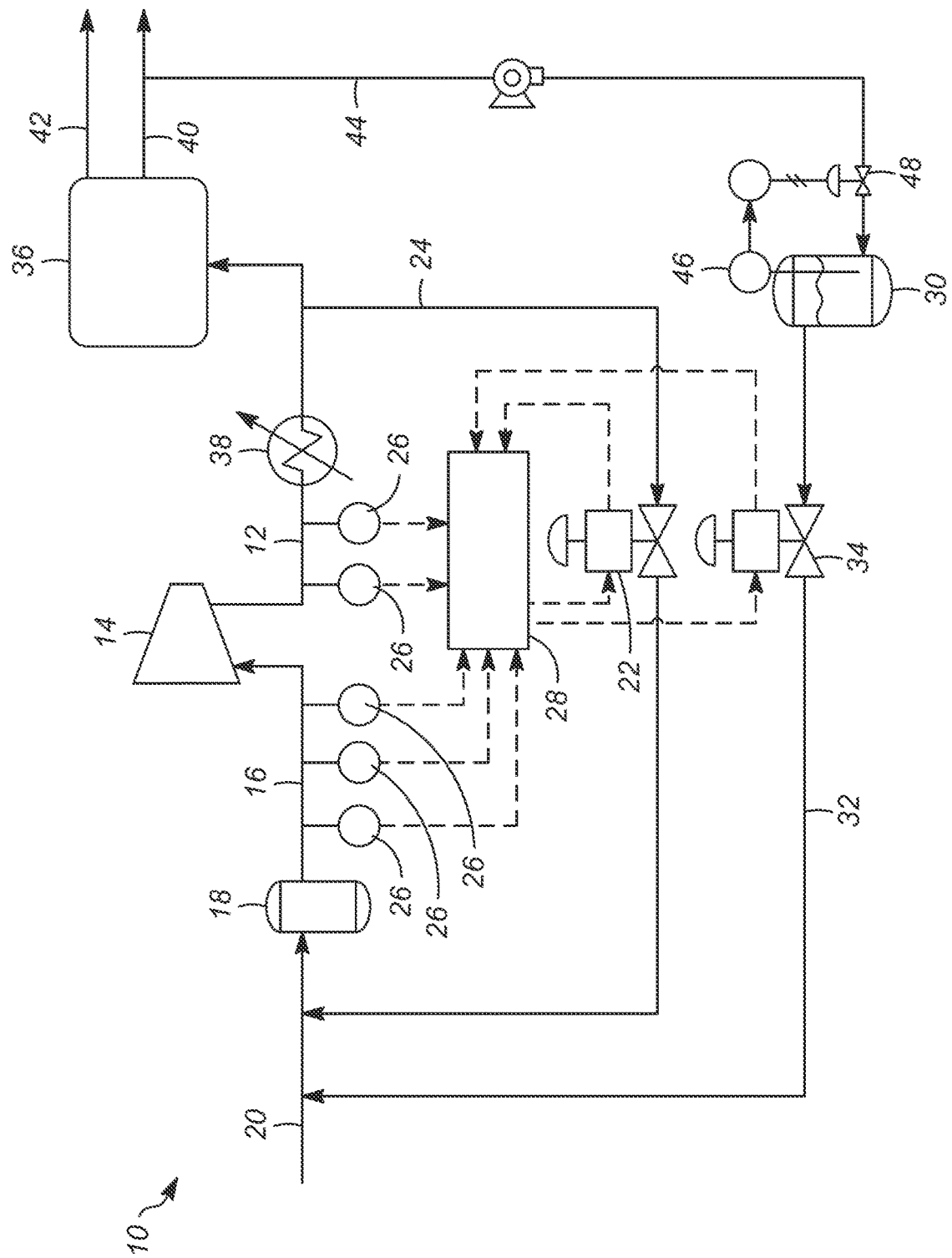
FIG. 1 is a schematic diagram of an apparatus according to one or more embodiments of the present invention.

As shown in FIG. 1, an apparatus 10 for producing a high-pressure gas stream 12 according to the present invention includes a centrifugal compressor 14. As is known, the centrifugal compressor 14 receives a gas stream 16 and provides the high-pressure gas stream 12 having a pressure higher than a pressure of the gas stream 16. The gas stream 16 may be provided from a suction drum 18. The suction drum 18 provides some mitigation of fluctuations of composition in the source gas stream 20.

Additionally, as is known, a valve 22 on a slipstream 24 of the high-pressure gas stream 12 may be used to recycle a portion of the high-pressure gas stream 12 to the gas stream 16 to further address and mitigate the impact of surges on the centrifugal compressor 14.

As is known, one or more sensors 26 may obtain information about the gas stream 16, such as pressure, temperature, etc., as well as information about the high-pressure gas stream 12. The sensors 26 may be in communication with a controller 28 which may compare the obtained information against one or more thresholds and determine when/if additional buffer gas (via the slipstream 24) needs to be added.

The controller 28 is a computing device having a processing and a memory which has stored therein computer-executable instructions for implementing the methods and processes described herein. The controller 28 or a computing device may be any suitable devices configured to cause a series of steps to be performed so as to implement the various methods or steps such that instructions, when executed by the computing device or other programmable apparatus, may cause various functions/acts/steps described herein to be executed. The controller 28 or a computing device may be, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RANI), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by the controller 28 or a computing device.

The methods and steps described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods of changing the configuration of the valve described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Accordingly, in response to signals or instructions from the controller 28, the valve 22 may be opened or closed, to either increase or decrease the flow rate of the recycle gas stream 24. However, this can create fluctuations in the high-pressure gas stream 12 and impact downstream processing of same.

The present invention addresses this issue by including a storage tank 30 holding a liquid buffer material. A line 32 is provided to pass a gas stream of the buffer material from the storage tank 30 to the centrifugal compressor 14.

Additionally, a valve 34 is disposed in the line 32 so that a flow rate of the gas stream provided to the centrifugal compressor 14 may be controlled. Accordingly, the valve 34 may be in communication with the controller 28. Based on the information obtained from the one or more sensors 26 and a comparison against a threshold, the controller 28 may send signals or instructions to the valve 34 to either increase or decrease the flow rate of the gas stream of the buffer material to address the variations or fluctuations in the gas stream 16. The controller 28 may also be in communication with other sources of information, including, for example, the processing unit that provides the source gas stream 20.

It is preferred that the buffer material comprise a component of the gas stream 16. Accordingly, the apparatus 10 may further including a product recovery zone 36 that receives the high-pressure gas stream 12. More specifically, after being cooled in heat exchanger 38, the high-pressure gas stream 12 is passed to the product recovery zone 36 where it is separated into, for example, a liquid product stream 40 and at least one other stream 42.

In a particularly preferred configuration, the product recovery zone 36 is a cryogenic fraction column or unit. As is known, a cryogenic fractionation column is a conventional distillation column containing a plurality of vertically spaced trays, one or more packed beds, or some combination of trays and packing. Reboilers (such as a bottom reboiler and a side reboiler) which heat and vaporize a portion of the liquids flowing down the column to provide the stripping vapors which flow up the column to strip the liquids flowing down. In addition to reboilers, other heat exchangers may be utilized to transfer heat to/from the liquid and gas in the cryogenic fraction column. The trays and/or packing provide the necessary contact between the stripping vapors rising upward and cold liquid falling downward, so that the column bottom liquid product stream exits the bottom of the tower, based on reducing the hydrogen and lighter component concentration in the bottom product to make a relatively pure carbon dioxide product that may be the liquid product stream 40.

In addition to being abundant, and produced at the product recovery zone 36, the use of carbon dioxide allows for a buffer material with a relatively high molecular weight. This means that less buffer material is required to offset the molecular weight fluctuations.

A line 44 is provided to pass a portion of the liquid product stream 40 to the storage tank 30. In order to ensure a sufficient supply a level sensor 46 may be provided to measure a level of liquid in the storage tank 30. If the level of the material drops below a certain level, a valve 48 may be opened and the storage tank 30 filled to a suitable level.

Figure 2:
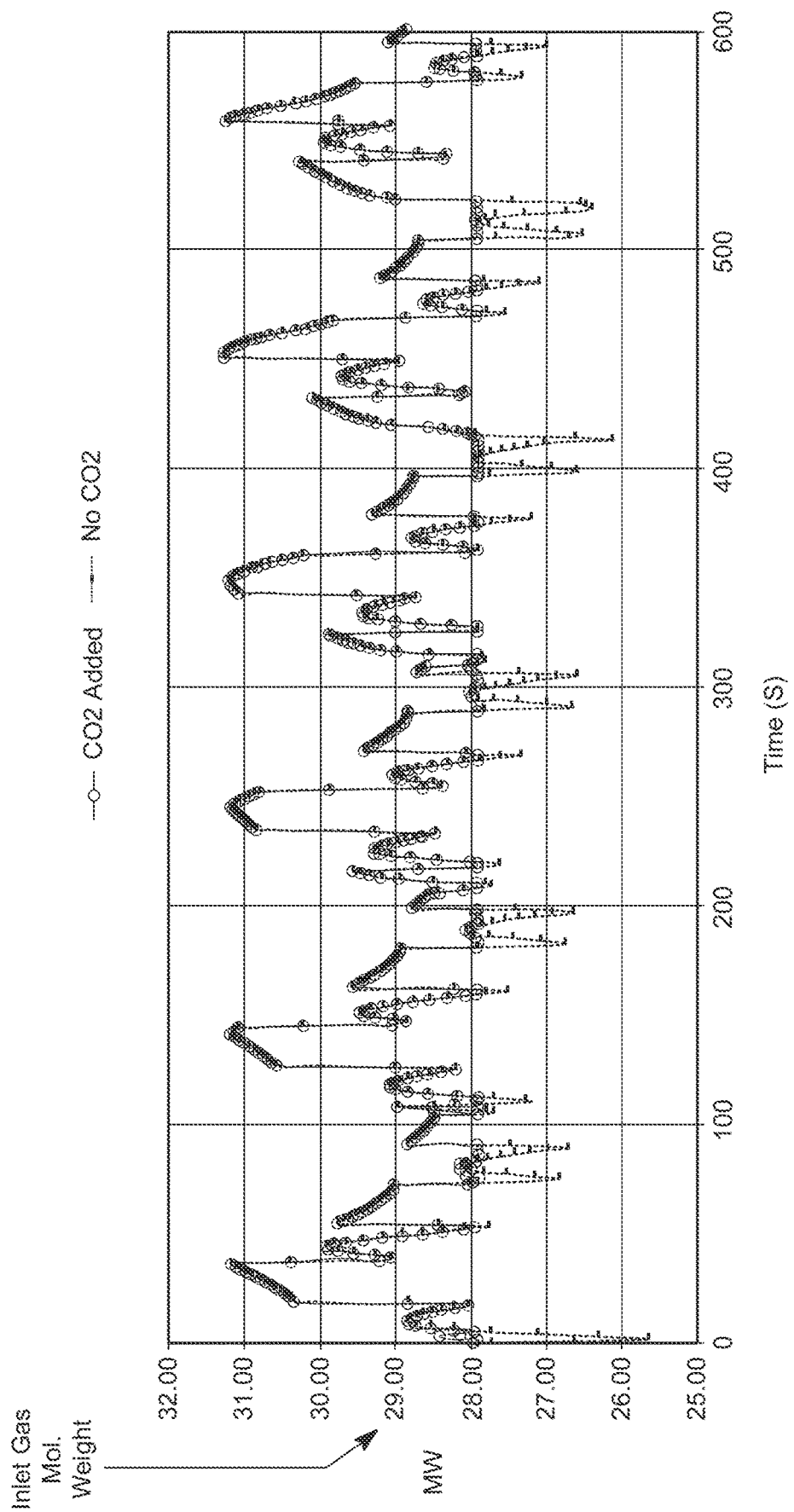
FIG. 2 is a graph showing the molecular weight fluctuations associated with a PSA unit cycling; and, FIG. 3 is a graph showing injection of carbon dioxide into the feed of a centrifugal compressor.

FIG. 2 shows carbon dioxide buffering during normal operation of a centrifugal compressor associated with a carbon dioxide fractionation process on hydrogen plant PSA tail gas (SMR retrofit). Carbon dioxide was injected during periods when inlet gas density drops below a pre-defined threshold (due to normal compositional variation during the PSA cycle). This buffering provides stable compressor operation and prevents flow disturbances to the downstream process (since the primary spillback loop is not used).

Figure 3:
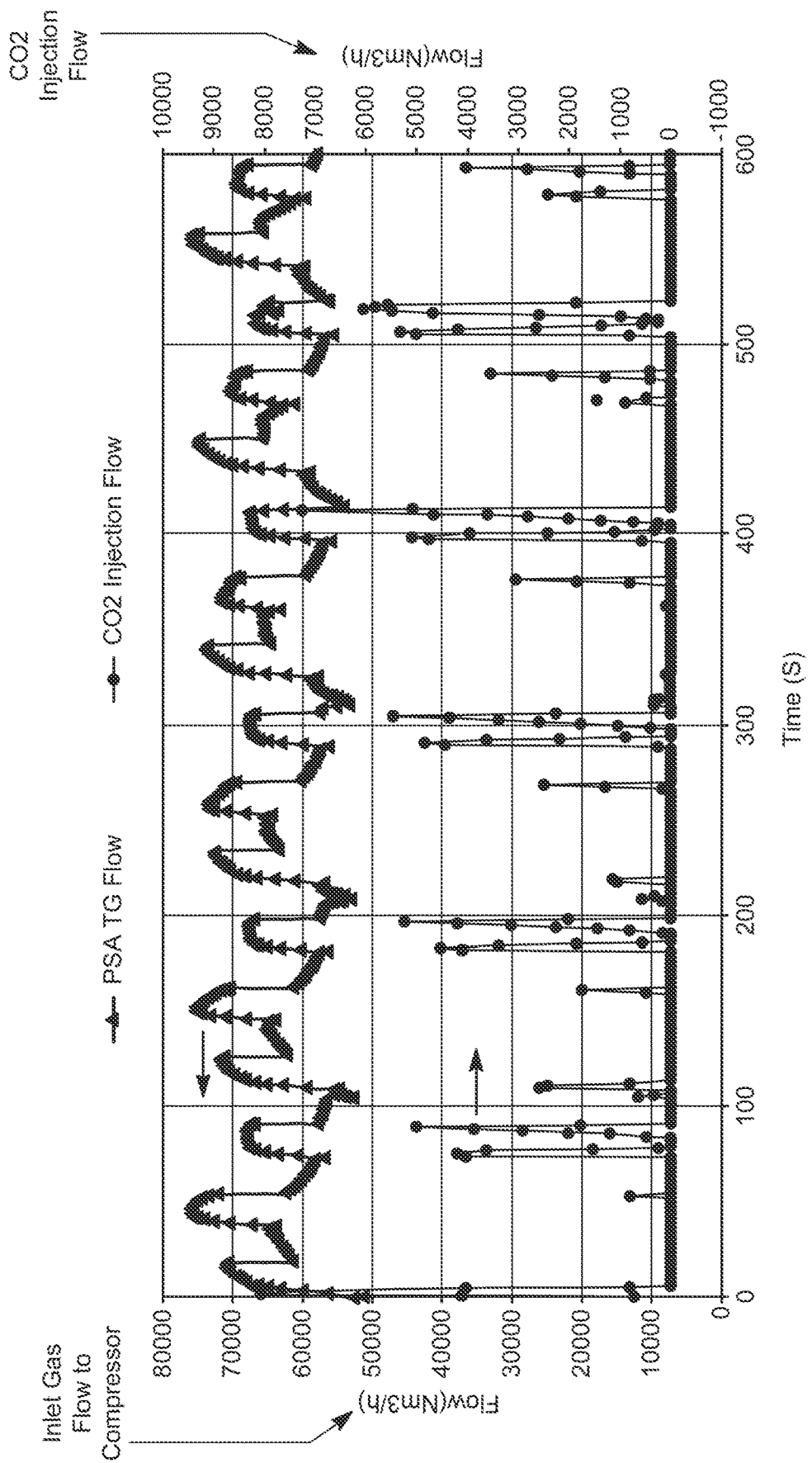

FIG. 3 shows carbon dioxide injection flow vs. time. A relatively small flow rate is used to provide the required buffering. The maximum carbon dioxide injection flow is approximately 10% of inlet gas flow.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for compressing a gas stream, the process comprising passing a feed stream to a centrifugal compressor, the feed stream comprising a gas stream; mixing, upstream up of the compressor, a buffer stream, from a storage vessel, with the feed stream, wherein the storage vessel comprises a liquid buffer material, and the buffer stream comprises a gaseous phase of the liquid buffer material; and, increasing a pressure of the feed stream and the buffer stream in the compressor to provide a high-pressure gas stream having pressure greater than a pressure of the feed stream. An embodiment of the invention is one, any or all of prior embodiments in this paragraph up through the first embodiment in this paragraph, further comprising adjusting a flow rate of the buffer stream mixed with the feed stream. An embodiment of the invention is one, any or all of prior embodiments in this paragraph up through the first embodiment in this paragraph, wherein the flow rate is adjusted based on one or more conditions of the feed stream. An embodiment of the invention is one, any or all of prior embodiments in this paragraph up through the first embodiment in this paragraph, further comprising monitoring the feed stream for the one or more conditions, and wherein the flow rate is adjusted based on the one or more conditions that are monitored. An embodiment of the invention is one, any or all of prior embodiments in this paragraph up through the first embodiment in this paragraph, further comprising separating the high-pressure gas stream into a liquid product stream and at least one other stream, wherein the liquid buffer material comprises a portion of the liquid product stream. An embodiment of the invention is one, any or all of prior embodiments in this paragraph up through the first embodiment in this paragraph, further comprising mixing, upstream of the compressor, a portion of the high-pressure gas stream with the feed stream.

A second embodiment of the invention is a process for compressing a gas stream, the process comprising passing a feed stream to a centrifugal compressor, the feed stream comprising a gas stream; obtaining data on one or more conditions of the feed stream; comparing the obtained data against one or more threshold values and when the obtained value is outside of the one or more thresholds, mixing, upstream up of the compressor, a buffer stream, from a storage vessel, with the feed stream, wherein the storage vessel comprises a liquid buffer material, and the buffer stream comprises a gaseous phase of the liquid buffer material; and, increasing a pressure of the feed stream and the buffer stream in the compressor to provide a high-pressure gas stream having pressure greater than a pressure of the feed stream. An embodiment of the invention is one, any or all of prior embodiments in this paragraph up through the second embodiment in this paragraph, wherein the liquid buffer material comprises carbon dioxide. An embodiment of the invention is one, any or all of prior embodiments in this paragraph up through the second embodiment in this paragraph, further comprising adjusting a flow rate of the buffer stream mixed with the feed stream based on the obtained data. An embodiment of the invention is one, any or all of prior embodiments in this paragraph up through the second embodiment in this paragraph, further comprising separating the high-pressure gas stream into a carbon dioxide product stream and at least one other stream, wherein the liquid buffer material comprises a portion of the carbon dioxide product stream. An embodiment of the invention is one, any or all of prior embodiments in this paragraph up through the second embodiment in this paragraph, further comprising mixing, upstream of the compressor, a portion of the high-pressure gas stream with the feed stream. An embodiment of the invention is one, any or all of prior embodiments in this paragraph up through the second embodiment in this paragraph, wherein the flow rate of the portion of the high-pressure gas stream mixed with the feed stream is determined by comparing the obtained data against one or more threshold values.

A third embodiment of the invention is an apparatus for producing a high-pressure gas stream, the apparatus comprising a centrifugal compressor configured to receive a gas stream and provide the high-pressure gas stream having a pressure higher than a pressure of the gas stream; a storage tank comprising a liquid buffer material; a line configured to provide a stream from the storage tank to the compressor; and, a valve in the line configured to control the flow rate of the stream provided to the compressor. An embodiment of the invention is one, any or all of prior embodiments in this paragraph up through the third embodiment in this paragraph further comprising a controller in communication with the valve, the controller configured to send instructions which adjust the valve. An embodiment of the invention is one, any or all of prior embodiments in this paragraph up through the third embodiment in this paragraph further comprising a second line configured to provide the gas stream to the compressor; and a sensor in communication with the line and configured to obtain information relating to a condition of the gas stream, the sensor in communication with the controller, and the controller being further configured to receive the obtained information from the sensor, compare the obtained information against one or more threshold values, and when the obtained information is outside of the one or more thresholds, send the instructions to adjust the valve. An embodiment of the invention is one, any or all of prior embodiments in this paragraph up through the third embodiment in this paragraph further comprising a product recovery zone configured to receive a stream comprising the high-pressure gas stream and separate the stream into a liquid product stream and at least one other stream; and, a line configured to provide a portion of the liquid product stream to the storage tank. An embodiment of the invention is one, any or all of prior embodiments in this paragraph up through the third embodiment in this paragraph further comprising a sensor configured to measure a level of liquid in the storage tank. An embodiment of the invention is one, any or all of prior embodiments in this paragraph up through the third embodiment in this paragraph, wherein the product recovery zone comprises a cryogenic fractionation unit. An embodiment of the invention is one, any or all of prior embodiments in this paragraph up through the third embodiment in this paragraph, wherein the liquid buffer material comprises carbon dioxide. An embodiment of the invention is one, any or all of prior embodiments in this paragraph up through the third embodiment in this paragraph further comprising a line configured to provide a recycle high pressure gas stream to the gas stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for compressing a gas stream, the process comprising:
   passing a feed stream to a centrifugal compressor, the feed stream comprising a gas stream;
   mixing, upstream up of the compressor, a buffer stream, from a storage vessel, with the feed stream, wherein the storage vessel comprises a liquid buffer material, and the buffer stream comprises a gaseous phase of the liquid buffer material; and,
   increasing a pressure of the feed stream and the buffer stream in the compressor to provide a high-pressure gas stream having pressure greater than a pressure of the feed stream.

2. The process of claim 1, further comprising:
   adjusting a flow rate of the buffer stream mixed with the feed stream.

3. The process of claim 2, wherein the flow rate is adjusted based on one or more conditions of the feed stream.

4. The process of claim 3, further comprising:
   monitoring the feed stream for the one or more conditions, and wherein the flow rate is adjusted based on the one or more conditions that are monitored.

5. The process of claim 1, further comprising:
separating the high-pressure gas stream into a liquid product stream and at least one other stream,
wherein the liquid buffer material comprises a portion of the liquid product stream.

6. The process of claim 1, further comprising:
mixing, upstream of the compressor, a portion of the high-pressure gas stream with the feed stream.

7. A process for compressing a gas stream, the process comprising:
passing a feed stream to a centrifugal compressor, the feed stream comprising a gas stream;
obtaining data on one or more conditions of the feed stream;
comparing the obtained data against one or more threshold values and when the obtained data is outside of the one or more threshold values, mixing, upstream up of the compressor, a buffer stream, from a storage vessel, with the feed stream, wherein the storage vessel comprises a liquid buffer material, and the buffer stream comprises a gaseous phase of the liquid buffer material; and,
increasing a pressure of the feed stream and the buffer stream in the compressor to provide a high-pressure gas stream having pressure greater than a pressure of the feed stream.

8. The process of claim 7, wherein the liquid buffer material comprises carbon dioxide.

9. The process of claim 8, further comprising:
adjusting a flow rate of the buffer stream mixed with the feed stream based on the obtained data.

10. The process of claim 8, further comprising:
separating the high-pressure gas stream into a carbon dioxide product stream and at least one other stream,
wherein the liquid buffer material comprises a portion of the carbon dioxide product stream.

11. The process of claim 8, further comprising:
mixing, upstream of the compressor, a portion of the high-pressure gas stream with the feed stream.

12. The process of claim 11, wherein a flow rate of the portion of the high-pressure gas stream mixed with the feed stream is determined by comparing the obtained data against the one or more threshold values.

13. An apparatus for producing a high-pressure gas stream, the apparatus comprising:
a centrifugal compressor configured to receive a gas stream and provide the high-pressure gas stream having a pressure higher than a pressure of the gas stream;
a storage tank comprising a liquid buffer material;
a line configured to provide a stream from the storage tank to the compressor; and,
a valve in the line configured to control a flow rate of the stream provided to the compressor.

14. The apparatus of claim 13 further comprising:
a controller in communication with the valve, the controller configured to send instructions which adjust the valve.

15. The apparatus of claim 14 further comprising:
a second line configured to provide the gas stream to the compressor; and
a sensor in communication with the line and configured to obtain information relating to a condition of the gas stream, the sensor in communication with the controller, and the controller being further configured to:
receive the obtained information from the sensor,
compare the obtained information against one or more threshold values, and
when the obtained information is outside of the one or more threshold values, send the instructions to adjust the valve.

16. The apparatus of claim 13 further comprising:
a product recovery zone configured to receive a stream comprising the high-pressure gas stream and separate the stream into a liquid product stream and at least one other stream; and,
a line configured to provide a portion of the liquid product stream to the storage tank.

17. The apparatus of claim 16 further comprising:
a sensor configured to measure a level of liquid in the storage tank.

18. The apparatus of claim 16, wherein the product recovery zone comprises a cryogenic fractionation unit.

19. The apparatus of claim 18, wherein the liquid buffer material comprises carbon dioxide.

20. The apparatus of claim 13 further comprising:
a line configured to provide a recycle high pressure gas stream to the gas stream.

* * * * *